US012164268B2

(12) United States Patent
Guillaume et al.

(10) Patent No.: US 12,164,268 B2
(45) Date of Patent: Dec. 10, 2024

(54) TOURBILLON FOR A HOROLOGY MOVEMENT

(71) Applicant: Manufacture d'Horlogerie Audemars Piguet SA, Le Brassus (CH)

(72) Inventors: Xavier Guillaume, Le Locle (CH); Giulio Papi, La Chaux-de-Fonds (CH); Laurent Calame, La Sagne (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 433 days.

(21) Appl. No.: 17/552,062

(22) Filed: Dec. 15, 2021

(65) Prior Publication Data

US 2022/0197219 A1 Jun. 23, 2022

(30) Foreign Application Priority Data

Dec. 17, 2020 (CH) .................................... 01611/20

(51) Int. Cl.
*G04B 17/28* (2006.01)
*G04B 17/06* (2006.01)

(52) U.S. Cl.
CPC ......... *G04B 17/285* (2013.01); *G04B 17/063* (2013.01)

(58) Field of Classification Search
CPC .... G04B 17/285; G04B 17/063; G04B 17/32; G04B 15/14

(Continued)

(56) References Cited

U.S. PATENT DOCUMENTS 1,867,947 A * 7/1932 Kohler ................... G04B 15/14 968/102
2,481,213 A * 9/1949 Gummersall .......... G04B 15/08 70/463

(Continued)

FOREIGN PATENT DOCUMENTS

CH 713 529 9/2018
CN 204 576 069 8/2015

(Continued)

OTHER PUBLICATIONS

Search Report for CH U.S. Appl. No. 16/112,020 dated Mar. 22, 2021, 6 pages.

*Primary Examiner* — Edwin A. Leon
*Assistant Examiner* — Kevin Andrew Johnston
(74) *Attorney, Agent, or Firm* — NIXON & VANDERHYE

(57) ABSTRACT

Disclosed is a tourbillon for a horology movement including a cage rotatably mounted on the horology movement, the cage bearing a regulating organ including a balance including a balance pivot pivotally mounted in balance bearings about a balance axis with an anchor including an anchor pivot pivotally mounted in anchor bearings about an anchor axis and arranged to cooperate both with the regulating organ and also with an escapement wheel including an escapement pivot pivotally mounted in escapement bearings about an escapement axis. The anchor and the escapement wheel are positioned relative to the balance so the distance between the anchor axis and the balance axis and the distance between the escapement axis and the balance axis are greater than the outer radius of the balance. Also disclosed is a movement including such a tourbillon as well as to a timepiece including such a movement.

20 Claims, 2 Drawing Sheets

(58) Field of Classification Search
USPC .......................................................... 368/127
See application file for complete search history.

(56) References Cited

U.S. PATENT DOCUMENTS

| | | | | |
|---|---|---|---|---|
| 2010/0046329 | A1 * | 2/2010 | Greubel | G04B 17/285 368/171 |
| 2020/0183330 | A1 * | 6/2020 | Stranczl | G04B 17/285 |

FOREIGN PATENT DOCUMENTS

| | | | | |
|---|---|---|---|---|
| EP | 2879005 | A2 * | 6/2015 | G04B 17/28 |
| EP | 3 650 954 | | 5/2020 | |
| EP | 3 663 868 | | 6/2020 | |

* cited by examiner

TOURBILLON FOR A HOROLOGY MOVEMENT

CROSS-REFERENCE TO RELATED APPLICATIONS

This application claims priority to Swiss Patent Application No. 01611/20 filed Dec. 17, 2020, the entire contents of which are hereby incorporated by reference.

BACKGROUND OF THE INVENTION

Field of the Invention

The present invention relates to a tourbillon for a horology movement comprising a cage intended to be rotatably mounted on said horology movement, said cage bearing a regulating organ comprising a balance comprising a balance pivot pivotally mounted in balance bearings about a balance axis and an anchor comprising an anchor pivot pivotally mounted in anchor bearings about an anchor axis and arranged to cooperate, on the one hand, with said regulating organ and, on the other hand, with an escapement wheel comprising an escapement pivot pivotally mounted in escapement bearings about an escapement axis.

The present invention also relates to a horology movement comprising such a tourbillon as well as to a timepiece comprising such a movement.

Description of the Related Art

Such tourbillons are mechanisms in widespread use in watches to cause the regulating organ to assume any vertical position, so allowing variations of rate due to the earth's attraction to cancel each other out. This makes it possible to improve the accuracy of the watch.

One example of a traditional tourbillon is described on page 167 of the book "Théorie d'horlogerie" [theory of watchmaking] by C-A. Reymondin et al., published by the Fédération des Ecoles Techniques (Switzerland), ISBN 2-940025-1 0-X.

The tourbillon functions like a seconds wheel and pinion, i.e. it meshes with the third wheel via a central pinion fixed under the cage. Inside the cage, the oscillating movement of the regulating organ is maintained by the escapement likewise mounted on the cage, the escapement pinion meshing with the external peripheral teeth of a fixed seconds wheel located beneath the cage and integral with the movement frame.

Traditionally, the pivot arrangements of the anchor and of the escapement wheel are located beneath the balance, so as not to interfere with its oscillating movement. To this end, the anchor and the escapement wheel are pivotally mounted in bearings arranged respectively in the lower bridge of the cage and in bridges integral with the lower bridge extending beneath the balance. However, as a result, a standard tourbillon is of a certain thickness because of the two levels or tiers respectively occupied by the balance and by the anchor and the escapement wheel.

A watch comprising such a tourbillon must therefore be sufficiently thick to accommodate it, which means that the standard tourbillon is not readily compatible with an ultra-thin watch.

Various solutions have been proposed to make the use of a tourbillon compatible with an ultra-thin watch. One solution involves reducing the safety features of the balance, the anchor and the escapement. However, this impairs the effectiveness of the regulating organ. Another solution involves omitting certain parts, such as, for example the upper cage. However, in this case, the disturbance brought about by the lack of freedom at the balance is non-negligible.

The present invention is directed at remedying these drawbacks by proposing a tourbillon which is of reduced thickness in comparison with a standard tourbillon, and is compatible with use in an ultra-thin movement, while retaining the traditional arrangement of the regulating organ in the tourbillon cage, without impairing the safety features of said regulating organ.

SUMMARY OF THE INVENTION

To this end, the invention relates to a tourbillon for a horology movement comprising a cage intended to be rotatably mounted on said horology movement, said cage bearing a regulating organ comprising a balance comprising a balance pivot pivotally mounted in balance bearings about a balance axis together with an anchor comprising an anchor pivot pivotally mounted in anchor bearings about an anchor axis and arranged to cooperate, on the one hand, with said regulating organ and, on the other hand, with an escapement wheel comprising an escapement pivot pivotally mounted in escapement bearings about an escapement axis.

According to the invention, the anchor and the escapement wheel are positioned relative to the balance in such a manner that the distance between the anchor axis and the balance axis and the distance between the escapement axis and the balance axis are greater than the outer radius of the balance.

Thus, the pivot arrangements of the anchor and the escapement wheel may be positioned so as to extend beyond the diameter of the balance.

Particularly advantageously, the anchor pivot and the escapement pivot are at least partly located at the same level as the balance, along the thickness direction of said anchor pivot and escapement pivot, the anchor bearings and the escapement bearings being arranged between two parallel planes defined by the balance bearings.

The pivot arrangements of the anchor and the escapement wheel may accordingly be positioned outside the balance, substantially at one and the same level as the balance, in such a manner that the thickness of the tourbillon may be reduced, without there being any need to modify the arrangement of said balance.

The present invention also relates to a movement comprising a tourbillon as defined above as well as to a timepiece comprising such a movement. This movement and this timepiece according to the invention have the advantage that they can be ultra-thin.

BRIEF DESCRIPTION OF THE DRAWINGS

Other features and advantages of the present invention will become apparent from reading the following detailed description of an embodiment of the invention, which is provided by way of non-limiting example and made with reference to the appended drawings in which.

DESCRIPTION OF THE PREFERRED EMBODIMENTS

Figure 1:
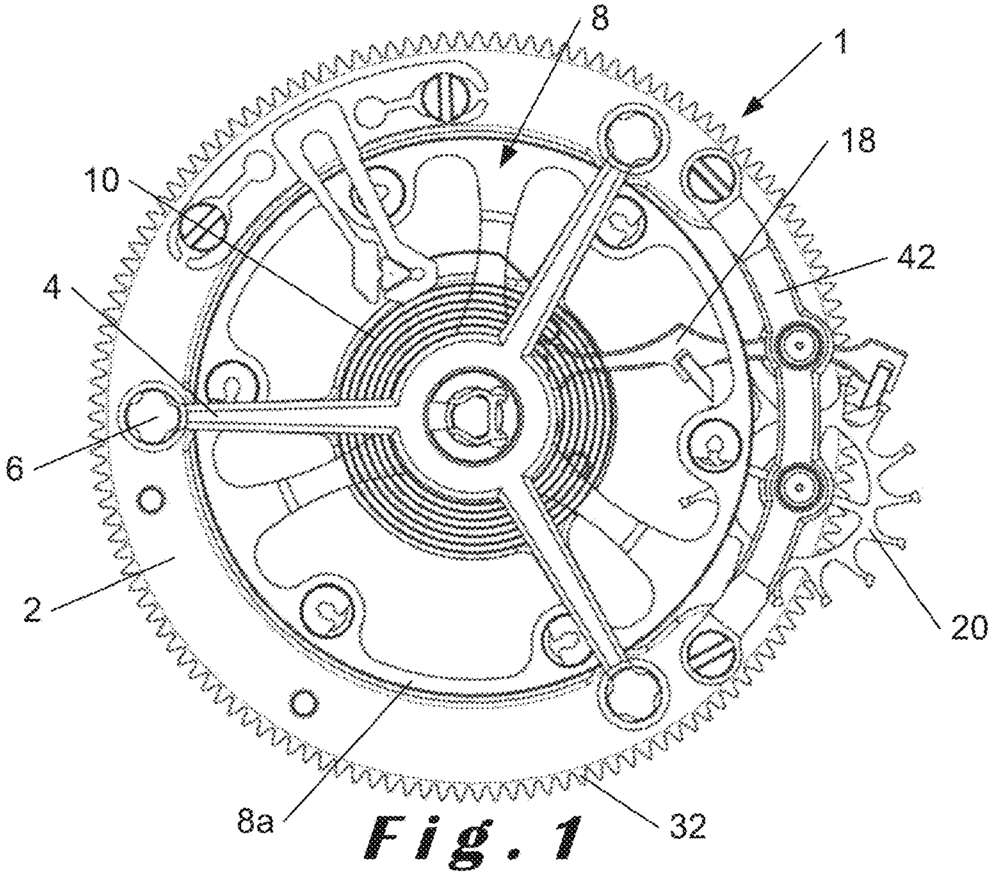
FIG. 1 is a plan view of the tourbillon according to the invention.

With reference to the figures, the present invention relates to a tourbillon 1 for a horology movement comprising a cage intended to be rotatably mounted about an axis A on a frame element of said horology movement (not shown) and comprising a lower bridge 2 and an upper bridge 4 which are parallel and joined to one another by pillars 6.

As is conventional, the cage bears a regulating organ comprising a balance 8 and a balance spring 10. The balance 8 comprises a circular felloe 8*a* integral with a balance pivot 12 pivotally mounted about a balance axis A in balance bearings 14, 15, such as anti-shock bearings, borne respectively by the lower 2 and upper 4 bridges. The balance 8 is located inside the cage, the balance axis A corresponding to the axis of rotation of the cage. The felloe 8*a* has a maximum radius, denoted outer radius R of the balance 8. The balance spring 10 is arranged above the balance 8. One end of the balance spring 10 is integral with the balance pivot 12 and the other end with a stud-holder 16 mounted on the upper bridge 4.

The cage also bears an anchor 18 and an escapement wheel and pinion comprising an escapement wheel 20 and escapement pinion 22 (cf. FIG. 5) integral with said escapement wheel 20.

Figure 3:
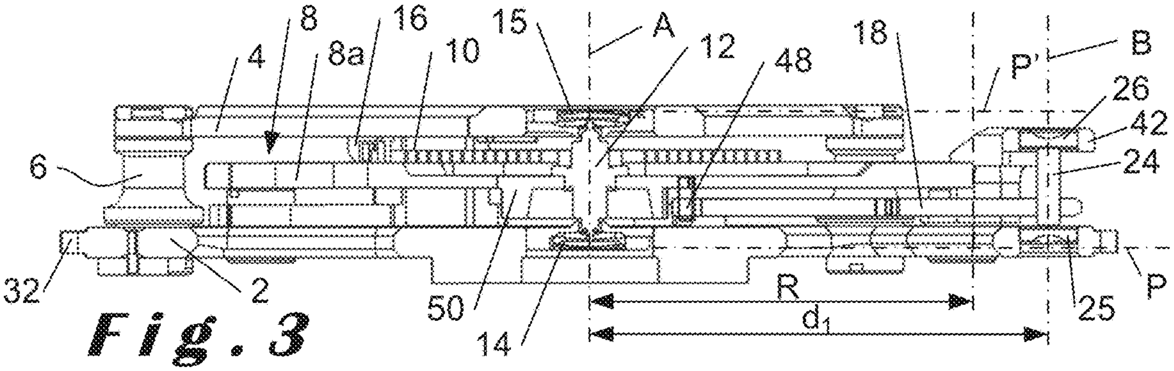
FIG. 3 is a sectional view of FIG. 1.

With particular reference to FIG. 3, the anchor 18 comprises a anchor pivot 24 pivotally mounted in anchor bearings 25, 26, such as stones, about an anchor axis B. The anchor 18 is arranged to cooperate, on the one hand, with said regulating organ and, on the other hand, with the escapement wheel 20, by means of its two pallets 27*a*, 27*b*. The anchor 18 will be described in detail below.

Figure 5:
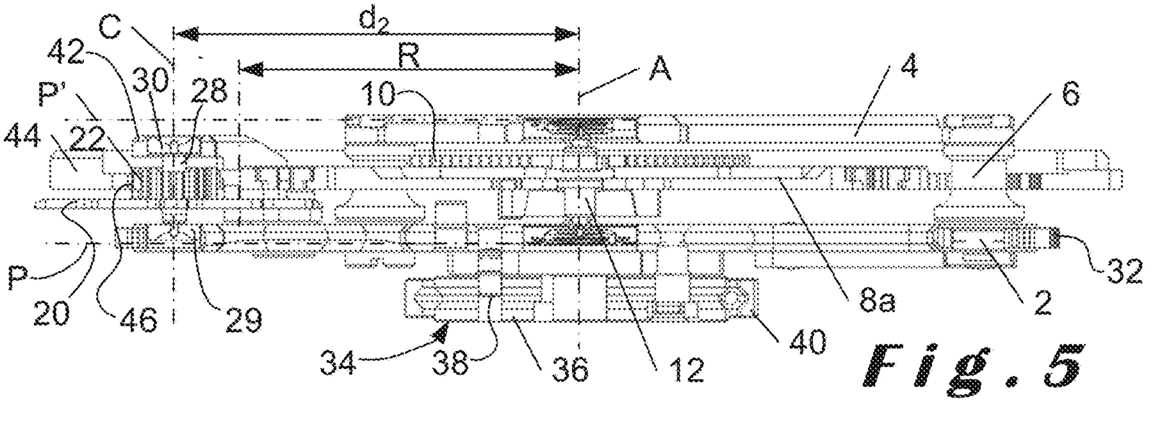
FIG. 5 is a sectional view of FIG. 4.

With particular reference to FIG. 5, the escapement wheel 20 comprises an escapement pivot 28 pivotally mounted in escapement bearings 29, 30, such as stones, about an escapement axis C. Said escapement pivot 28 also bears the escapement pinion 22.

In the example shown here, the cage is driven in rotation by the gear train of the movement via external peripheral teeth 32 provided around a circular crown forming the lower bridge 2. The cage is intended to be assembled with the frame element of the horology movement via a ball bearing 34, in such a manner that the tourbillon illustrated here is of the flying tourbillon type. With reference to FIG. 5, the ball bearing 34 comprises a hub 36 integral with the cage by means of a pin 38 providing rotational mounting between the lower bridge 2 and the hub 36, and an outer ring 40, intended to be made integral with a frame element of the horology movement. Such a ball bearing is known to a person skilled in the art and requires no detailed description.

According to the invention, the anchor 18 and the escapement wheel 20 are positioned relative to the balance 8 in such a manner that the distance d1 between the anchor axis B and the balance axis A (see FIG. 3) and the distance d2 between the escapement axis C and the balance axis A (see FIG. 5) are greater than the outer radius R of the balance 8.

Particularly preferably, the anchor pivot 24 and the escapement pivot 28 are at least in part, and preferably entirely, located at the same level as the balance 8, along the thickness direction of said anchor pivot 24 and escapement pivot 28, the anchor bearings 25, 26 and the escapement bearings 29, 30 being arranged between two parallel planes P, P' defined by the bottoms of the balance bearings 14, 15 respectively.

Preferably, the balance pivot 12, the anchor pivot 24 and the escapement pivot 28 are of substantially identical thickness and are located substantially at the same level, along the thickness direction of said pivots 12, 24, 28.

To this end, the tourbillon 1 also comprises an escapement bridge 42 extending outside the balance 8, and integral with the lower bridge 2. The escapement bridge 42 is arranged to bear one of the anchor bearings, namely the upper anchor bearing 26, and one of the escapement bearings, namely the upper escapement bearing 30, the other of the anchor bearings, namely the lower anchor bearing 25, and the other of the escapement bearings, namely the lower escapement bearing 29, being borne by the circular crown forming the lower bridge 2. The diameter of the circular crown forming the lower bridge 2 is selected such that the lower bridge extends sufficiently outside the balance 8 in such a way that the anchor pivot 24 and escapement pivot 28 may be positioned outside the diameter of said balance 8.

Other embodiments may, of course, also be provided, depending on the configuration of the lower and upper bridges and the thickness which is desired for the tourbillon. For example, when the upper bridge takes the form of a plate, the upper anchor and escapement bearings may be mounted on the upper bridge, the lower anchor and escapement bearings being mounted either on the lower bridge, or on an escapement bridge integral with the upper bridge, at the height required such that the anchor is capable of cooperating with the regulating organ. It is also possible to provide specific bridges for the anchor and the escapement wheel, integral with the lower and upper bridges, what is essential being that the anchor and escapement bridges, borne by the cage, extend outside the balance 8 such that the anchor pivot 24 and escapement pivot 28 project beyond the diameter of the balance 8, and are at the required height for the anchor 18 to be capable of cooperating with the regulating organ.

The escapement bridge 42 preferably has the shape of an arc of a circle coaxial with the axis A, such that the anchor 18 and the escapement wheel 20 are positioned in such a manner that the distance d1 between the anchor axis B and the balance axis A is equal to the distance d2 between the escapement axis C and the balance axis A.

Figure 4:
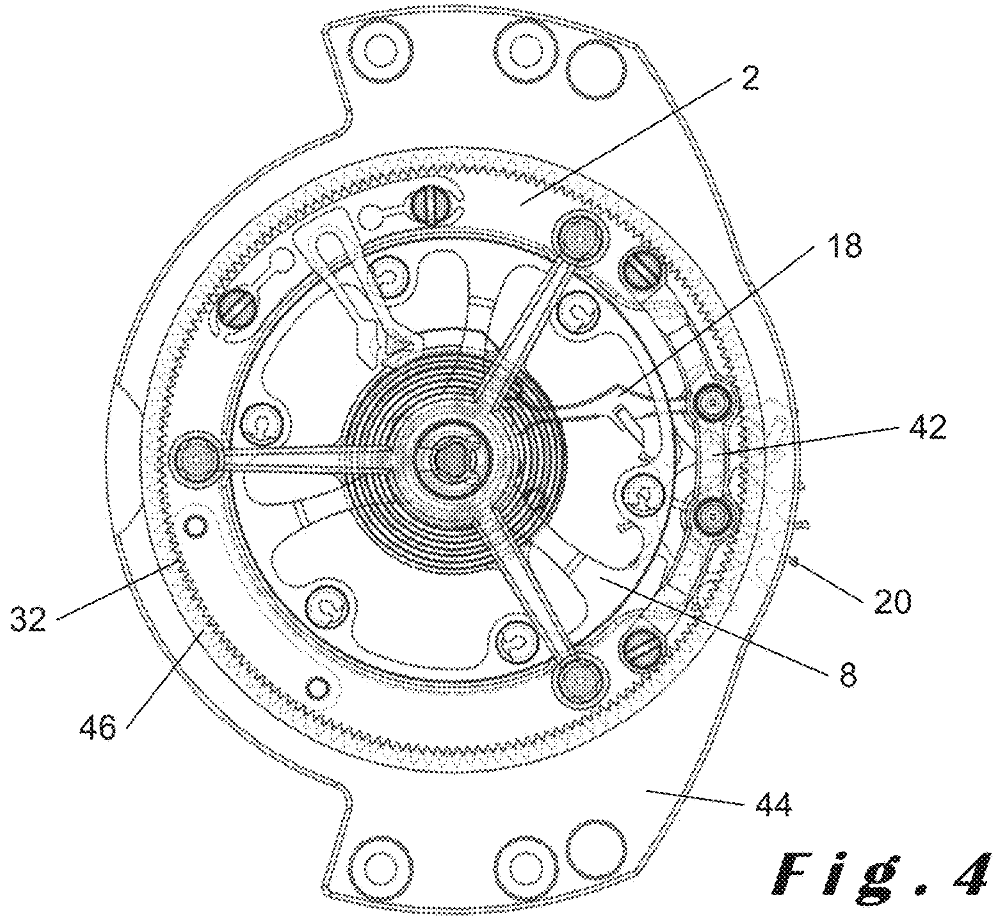
FIG. 4 is a plan view of the tourbillon and the fixed seconds wheel.

Advantageously, unlike in a standard tourbillon design, the escapement pinion 22 is positioned around the escapement pivot 28 above the escapement wheel 20, facing the escapement bridge 42. With reference to FIGS. 4 and 5, a fixed seconds wheel 44 is provided which is centred on the axis A of the balance or the tourbillon, is integral with an element of the movement frame, and is arranged to cooperate with the escapement pinion 22. Unlike in a standard tourbillon design, the fixed seconds wheel 44 is of a diameter greater than that of the cage, and in particular than the diameter of the lower bridge 2, in such a manner that the fixed seconds wheel 44 surrounds the tourbillon 1. The fixed seconds wheel 44 furthermore has internal peripheral teeth 46 arranged to mesh with the escapement pinion 22. Consequently, the escapement pinion 22 being positioned substantially at the same level as the balance 8, the fixed seconds wheel 44 is also positioned substantially at the same level as the balance 8, instead of being located under the cage of a standard tourbillon. This makes it possible to reduce the dimensions of the assembly still further.

The applicant's design of a new anchor escapement assembly, which has enabled the development of a new escapement disposition (escapement axis/anchor axis distance and anchor axis/balance axis distance), has made it possible to position the anchor pivot 24 outside the diameter of the balance 8. Such an escapement assembly is described in patent application EP 20180912 filed by the applicant, which is incorporated by reference into the present application.

Figure 2:
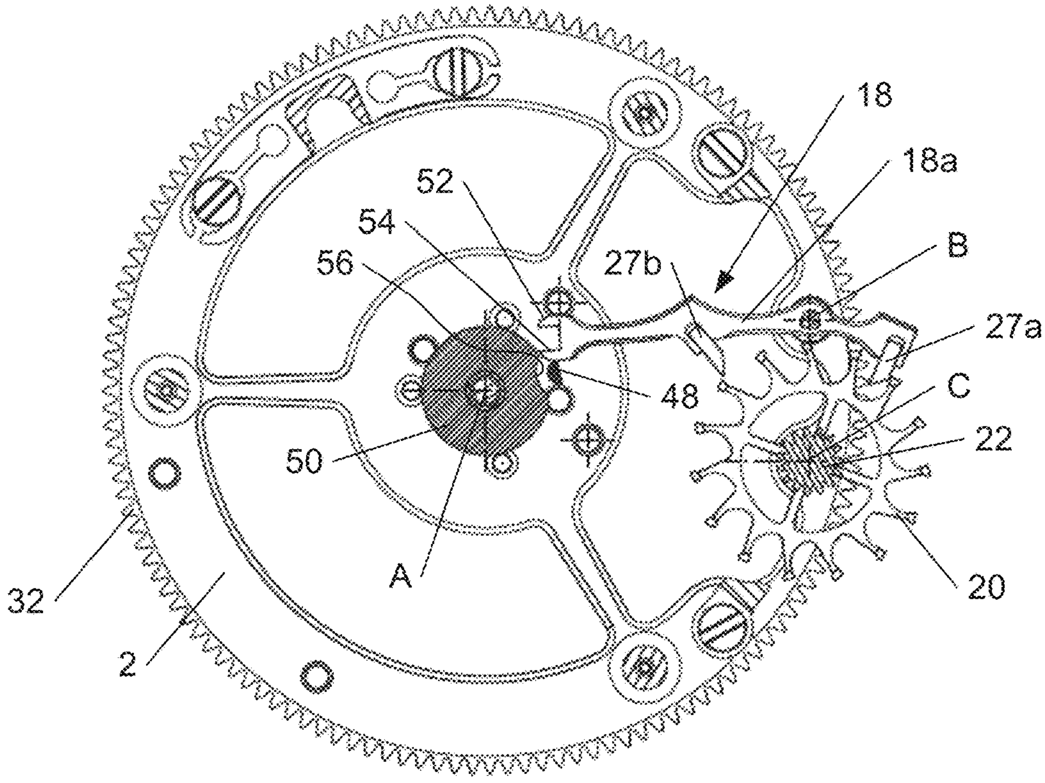
FIG. 2 shows a plan view of the lower bridge bearing the anchor and the escapement wheel in knocking position.

Advantageously, and with particular reference to FIG. 2, the anchor 18 has no guard pin to save thickness, and comprises, on the one hand, an entry pallet 27*a* and an exit pallet 27*b*, intended to cooperate alternately with the escapement wheel 20 and, on the other hand, a fork intended to cooperate with a pin 48 borne by the balance 8 and comprising first 52 and second 54 horns defining a fork entry. A roller 50 integral with the balance 8 is at least partly located at the same level as the pin 48, along the thickness direction of the roller 50 (see FIG. 3). The roller 50 has a generally cylindrical anti-overbanking wall in which a notch 56 is provided in a region adjacent to the pin 48. The anchor 18, the roller 50 and the pin 48 are shaped and dimensioned such that, in a service position, said anti-overbanking wall is capable of defining a stop for the first and second horns 52, 54, said anchor 18, said roller 50 and said pin 48 being furthermore shaped and dimensioned such that, in the service position, each of said horns 52, 54 is able to penetrate into the interior of the notch 56 exclusively when the pin 48 is at least partly located in the fork entry.

Each of the horns 52, 54 of the fork has an inner wall defining the entry of said fork and an outer wall shaped and dimensioned such that, in a knocking situation, the distance between the point of contact of the pin 48 on the outer wall of the horn 52, 54 in question and the end of said outer wall closest to the inner wall is greater than the distance between the pin 48 and that of the junctions between the anti-overbanking wall and the notch 56 which is closest to the horn 52, 54 in question.

Thus, in addition to their conventional function, the horns 52, 54 are intended to provide overbanking protection. The horns 52, 54 replace the guard pin in the anti-overbanking function thereof and have a width greater than the typical width of the guard pin. Thus, the notch 48 must be enlarged relative to conventional escapements and the roller 50 itself must also be enlarged as a result. These modifications entail making the lever 18*a* longer.

The lever 18*a* connects the entry and exit pallets 27*a*, 27*b* to the fork and is capable of pivoting between two extreme positions, in the service position, defining a maximum angle of travel of the anchor 18, the outer wall of each of the horns 52, 54 having, starting from the end thereof closest to the inner wall, a first portion defining a safety surface and having a mean angle relative to the lever 18*a*, such that said safety surface is substantially tangential to the anti-overbanking wall when it is located facing the latter, followed by a second portion having an angle of the order of 0 to 45° relative to the lever 18*a* and extending at least up to the point of contact of the pin 48 on said outer wall in a knocking situation.

With this escapement assembly, the oscillation amplitude of the anchor 18 is unchanged. The knocking angle of the balance 8 (position shown in FIG. 2) is greater than in a standard configuration, which is favourable for isochronism.

The anchor 18 and the escapement wheel 20 are intended to be arranged, in the service position, such that the distance between the anchor axis B and balance axis A is at least equal to twice the distance between the anchor axis B and the escapement axis C, which defines a new escapement disposition.

The tourbillon according to the invention functions similarly to a standard tourbillon.

Thanks to a specific geometry of the anchor, a new escapement disposition has been defined to allow the anchor pivot and escapement pivot to be moved outside the balance. It is thus possible, by positioning the escapement and anchor pivots substantially at the same level as the balance pivot, to eliminate the tier or level usually occupied by the escapement in a standard tourbillon. As a result, the thickness of the tourbillon cage according to the invention is reduced.

Furthermore, the solution of the invention makes it possible to reduce the thickness of the cage without sacrificing the safety features between the balance, anchor and escapement wheel, nor the quality factor of the regulating organ. It also makes it possible not to disrupt operation of the balance, the standard balance pivots and traditional anti-shock bearings being retained.

Moreover, according to the preferred embodiment, the elimination of the conventional central seconds pinion and the positioning of the fixed seconds wheel at the height of the cage enable further thickness savings.

The invention therefore makes it possible to obtain an ultra-thin tourbillon, so enabling the use thereof in an ultra-thin movement or to save space in order to optimise the horology mechanisms.

The invention claimed is:

1. A tourbillon for a horology movement comprising a cage intended to be rotatably mounted on said horology movement, said cage bearing a regulating organ comprising a balance comprising a balance pivot pivotally mounted in balance bearings about a balance axis together with an anchor comprising an anchor pivot pivotally mounted in anchor bearings about an anchor axis and arranged to cooperate both with said regulating organ and also with an escapement wheel comprising an escapement pivot pivotally mounted in escapement bearings about an escapement axis, wherein the anchor and the escapement wheel are positioned relative to the balance in such a manner that the distance between the anchor axis and the balance axis and the distance between the escapement axis and the balance axis are greater than the outer radius of the balance.

2. The tourbillon according to claim 1, wherein the anchor pivot and the escapement pivot are at least partly located at the same level as the balance, along the thickness direction of said anchor pivot and escapement anchor bearings and the escapement bearings being arranged between two parallel planes defined by the balance bearings.

3. The tourbillon according to claim 1, wherein the cage comprises a lower bridge and an upper bridge bearing the balance bearings, and wherein the tourbillon also comprises an escapement bridge integral with the lower bridge and arranged to bear one of the anchor bearings and one of the escapement bearings, the other of the anchor bearings and the other of the escapement bearings being borne by said lower bridge.

4. The tourbillon according to claim 1, wherein the anchor and the escapement wheel are positioned in such a manner that the distance between the anchor axis and the balance axis is equal to the distance between the escapement axis and the balance axis.

5. The tourbillon according to claim 1, wherein the balance pivot, the anchor pivot and the escapement pivot are of substantially identical thickness and are located substantially at the same level, along the thickness direction of said balance pivot, anchor pivot and escapement pivot.

6. The tourbillon according to claim 1, wherein the anchor has no guard pin and comprises both an entry pallet and an exit pallet, intended to cooperate alternately with the escapement wheel, as well as a fork intended to cooperate with a pin integral with the balance, the balance integral with a roller, and comprising first and second horns defining a fork entry, said roller being at least partly located at the same level as said pin, along the thickness direction of the roller, said roller having a generally cylindrical anti-overbanking wall in which a notch is provided in a region adjacent to said pin, said anchor, said roller and said pin being shaped and dimensioned such that, in a service position, said anti-overbanking wall is capable of defining a stop for said first and second horns, said anchor, said roller and said pin being furthermore shaped and dimensioned such that, in the service position, each of said first and second horns is able to penetrate into the interior of said notch exclusively when said pin is at least partly located in said fork entry.

7. The tourbillon according to claim 6, wherein each of the first and second horns of said fork has an inner wall defining the entry of said fork and an outer wall shaped and dimensioned such that, in a knocking situation, the distance between the point of contact of said pin on the outer wall of the horn in question and the end of said outer wall closest to the inner wall is greater than the distance between the pin and that of the junctions between the anti-overbanking wall and the notch which is closest to the horn in question.

8. The tourbillon according to claim 6, wherein the anchor comprises a lever connecting said entry and exit pallets to said fork and capable of pivoting between two extreme positions, in the service position, so defining a maximum angle of travel of the anchor, said outer wall of each of said first and second horns having, starting from the end thereof closest to said inner wall, a first portion defining a safety surface and having a mean angle relative to said lever, such that said safety surface is substantially tangential to said anti-overbanking wall when said safety surface is located facing the anti-overbanking wall, followed by a second portion having an angle of the order of 0 to 45° relative to said lever, and extending at least up to the point of contact of said pin on said outer wall in a knocking situation.

9. The tourbillon according to claim 1, wherein the anchor and the escapement wheel are intended to be arranged, in the service position, such that the distance between the anchor axis and balance axis is at least equal to twice the distance between the anchor axis and the escapement axis.

10. The tourbillon according to claim 3, wherein the lower bridge of the cage comprises external peripheral teeth arranged to drive said cage in rotation.

11. The tourbillon according to claim 3, wherein the escapement wheel is integral with an escapement pinion, said escapement pinion being positioned above said escapement wheel, facing the escapement bridge.

12. The horology movement comprising the tourbillon according to claim 1.

13. The horology movement according to claim 12, the tourbillon comprising an escapement pinion integral with the escapement wheel, the movement further comprising a fixed seconds wheel, escapement pinion and said fixed seconds wheel being positioned substantially at the same level as the balance.

14. A timepiece comprising the horology movement according to claim 12.

15. The tourbillon according to claim 2, wherein the cage comprises a lower bridge and an upper bridge bearing the balance bearings, and wherein the tourbillon also comprises an escapement bridge integral with the lower bridge and arranged to bear one of the anchor bearings and one of the escapement bearings, the other of the anchor bearings and the other of the escapement bearings being borne by said lower bridge.

16. The tourbillon according to claim 2, wherein the anchor and the escapement wheel are positioned manner that the distance between the anchor axis and the balance axis is equal to the distance between the escapement axis and the balance axis.

17. The tourbillon according to claim 3, wherein the anchor and the escapement wheel are positioned in such a manner that the distance between the anchor axis and the balance axis is equal to the distance between the escapement axis and the balance axis.

18. The tourbillon according to claim 2, wherein the balance pivot, the anchor pivot and the escapement pivot are of substantially identical thickness and are located substantially at the same level, along the thickness direction of said balance pivot, anchor pivot and escapement pivot.

19. The tourbillon according to claim 3, wherein the balance pivot, the anchor pivot and the escapement pivot are of substantially identical thickness and are located substantially at the same level, along the thickness direction of said balance pivot, anchor pivot and escapement pivot.

20. The tourbillon according to claim 4, wherein the balance pivot, the anchor pivot and the escapement pivot are of substantially identical thickness and are located substantially at the same level, along the thickness direction of said balance pivot, anchor pivot and escapement pivot.

* * * * *